United States Patent
Fischer et al.

(10) Patent No.: US 10,151,176 B2
(45) Date of Patent: Dec. 11, 2018

(54) HEATER AND SUPPORTING STRUCTURE THEREOF

(71) Applicant: APTIV TECHNOLOGIES LIMITED, St. Michael (BB)

(72) Inventors: Bernhard A. Fischer, Honeoye Falls, NY (US); Charles J. Badura, Penfield, NY (US); Bruce E. Kirchner, Webster, NY (US)

(73) Assignee: APTIV TECHNOLOGIES LIMITED (BB)

( * ) Notice: Subject to any disclaimer, the term of this patent is extended or adjusted under 35 U.S.C. 154(b) by 582 days.

(21) Appl. No.: 14/680,108

(22) Filed: Apr. 7, 2015

(65) Prior Publication Data

US 2016/0298433 A1 Oct. 13, 2016

(51) Int. Cl.
*H01M 8/04007* (2016.01)
*E21B 36/00* (2006.01)
*E21B 41/00* (2006.01)
*E21B 43/24* (2006.01)

(52) U.S. Cl.
CPC ........ *E21B 36/008* (2013.01); *E21B 41/0085* (2013.01); *E21B 43/24* (2013.01); *H01M 8/04067* (2013.01)

(58) Field of Classification Search
CPC .................................. H01M 8/04067
See application file for complete search history.

(56) References Cited

U.S. PATENT DOCUMENTS

| | | |
|---|---|---|
| 6,684,948 B1 | 2/2004 | Savage |
| 6,720,099 B1 | 4/2004 | Haltiner, Jr. |
| 7,182,132 B2 | 2/2007 | Savage |
| 2001/0049039 A1 | 12/2001 | Haltiner, Jr. |
| 2004/0200605 A1 | 10/2004 | Yoshida et al. |
| 2004/0229096 A1 | 11/2004 | Standke et al. |

(Continued)

OTHER PUBLICATIONS

"Phase 1 Report, Geothermic Fuel Cell In-Situ Applications for Recovery of Unconventional Hydrocarbons"; Independent Energy Partners; Title: Geothermic Fuel Cells: Phase 1 Report, Dated Jun. 7, 2010.

(Continued)

*Primary Examiner* — Miriam Stagg
*Assistant Examiner* — Victoria H Lynch
(74) *Attorney, Agent, or Firm* — Lawrence D. Hazelton (57) ABSTRACT

A heater includes a heater housing extending along a heater axis; a fuel cell stack assembly disposed within the heater housing and having a plurality of fuel cells which convert chemical energy from a fuel into heat and electricity through a chemical reaction with an oxidizing agent; a first medium conduit fixed relative to the heater housing and in fluid communication with the fuel cell stack assembly, the first medium conduit including a first medium conduit shelf extending laterally from the first medium conduit; a second medium conduit fixed relative to the heater housing and in fluid communication with the fuel cell stack assembly, the second medium conduit including a second medium conduit shelf extending laterally from the second medium conduit; wherein the fuel cell stack assembly is supported on the first medium conduit shelf and the second medium conduit shelf.

29 Claims, 7 Drawing Sheets

(56) References Cited

U.S. PATENT DOCUMENTS

| | | | |
|---|---|---|---|
| 2005/0051155 A1* | 3/2005 | Tomlinson | F24H 3/0488 |
| | | | 126/116 R |
| 2006/0147771 A1 | 7/2006 | Russell et al. | |
| 2007/0048685 A1 | 3/2007 | Kuenzler et al. | |
| 2010/0163226 A1 | 7/2010 | Zornes | |
| 2012/0094201 A1 | 4/2012 | Haltiner, Jr. et al. | |

OTHER PUBLICATIONS

U.S. Appl. No. 14/081,068; Fischer et al; DP-321090, filed Nov. 15, 2013.
U.S. Appl. No. 14/013,708; Fischer et al.; DP-320937, filed Aug. 29, 2013.
U.S. Appl. No. 14/013,818; Fischer et al; DP-321194, filed Aug. 29, 2013.
U.S. Appl. No. 14/662,902; Fischer et al; DP-321833 filed Mar. 19, 2015.

\* cited by examiner

HEATER AND SUPPORTING STRUCTURE THEREOF

TECHNICAL FIELD OF INVENTION

The present invention relates to a heater which uses fuel cell stack assemblies as a source of heat; more particularly to such a heater which is positioned within a bore hole of an oil containing geological formation in order to liberate oil therefrom; even more particularly to such a heater in which the fuel cell stack assemblies are located within a heater housing; and still even more particularly to such a heater in which the fuel cell stack assemblies are supported within the heater housing by conduits which supply or exhaust medium to or from the fuel cell stack assemblies.

BACKGROUND OF INVENTION

Subterranean heaters have been used to heat subterranean geological formations in oil production, remediation of contaminated soils, accelerating digestion of landfills, thawing of permafrost, gasification of coal, as well as other uses. Some examples of subterranean heater arrangements include placing and operating electrical resistance heaters, microwave electrodes, gas-fired heaters or catalytic heaters in a bore hole of the formation to be heated. Other examples of subterranean heater arrangements include circulating hot gases or liquids through the formation to be heated, whereby the hot gases or liquids have been heated by a burner located on the surface of the earth. While these examples may be effective for heating the subterranean geological formation, they may be energy intensive to operate.

U.S. Pat. Nos. 6,684,948 and 7,182,132 propose subterranean heaters which use fuel cells as a more energy efficient source of heat. The fuel cells are disposed in a heater housing which is positioned within the bore hole of the formation to be heated. The fuel cells convert chemical energy from a fuel into heat and electricity through a chemical reaction with an oxidizing agent. U.S. Pat. Nos. 6,684,948 and 7,182,132 illustrate strings of fuel cells that may be several hundred feet in length. Operation of the fuel cells requires fuel and air to be supplied to each of the fuel cells and spent fuel (anode exhaust) and spent air (cathode exhaust) must be exhausted from each of the fuel cells. In order to do this, a fuel supply conduit and an air supply conduit are provided such that each extends the entire length of the string of fuel cells to supply fuel and air to each of the fuel cells. Similarly, an anode exhaust conduit and a cathode exhaust conduit are provided such that each extends the entire length of the string of fuel cells to expel anode exhaust and cathode exhaust from each of the fuel cells to the surface (e.g., the top of the bore hole of the formation).

The fuel supply conduits and air supply conduits of U.S. Pat. Nos. 6,684,948 and 7,182,132 are formed by openings in stamped sheets which are stacked together to form a continuous stack of fuel cells for the entire length of the heater housing. Consequently, the stamped sheets serve as the structure for supporting the fuel cells within the heater housing. However, it may be desirable to suspend individual fuel cell stack assemblies within the heater housing. When individual fuel cell stacks are suspended within the heater housing, a different approach is needed to support the fuel cell stacks within the heater housing.

What is needed is a heater which minimizes or eliminates one of more of the shortcomings as set forth above.

SUMMARY OF THE INVENTION

A heater includes a heater housing extending along a heater axis; a fuel cell stack assembly disposed within the heater housing and having a plurality of fuel cells which convert chemical energy from a fuel into heat and electricity through a chemical reaction with an oxidizing agent; a first medium conduit fixed relative to the heater housing and in fluid communication with the fuel cell stack assembly, the first medium conduit including a first medium conduit shelf extending laterally from the first medium conduit and facing upward, the first medium conduit shelf controlling an inlet flow of a first medium into the fuel cell manifold; a second medium conduit fixed relative to the heater housing and in fluid communication with the fuel cell stack assembly, the second medium conduit including a second medium conduit shelf extending laterally from the second medium conduit and facing upward, the second medium conduit shelf controlling an inlet flow of a second medium into the fuel cell manifold; wherein the fuel cell stack assembly is supported on the first medium conduit shelf and the second medium conduit shelf.

BRIEF DESCRIPTION OF DRAWINGS

This invention will be further described with reference to the accompanying drawings in which.

DETAILED DESCRIPTION OF INVENTION

Figure 1:
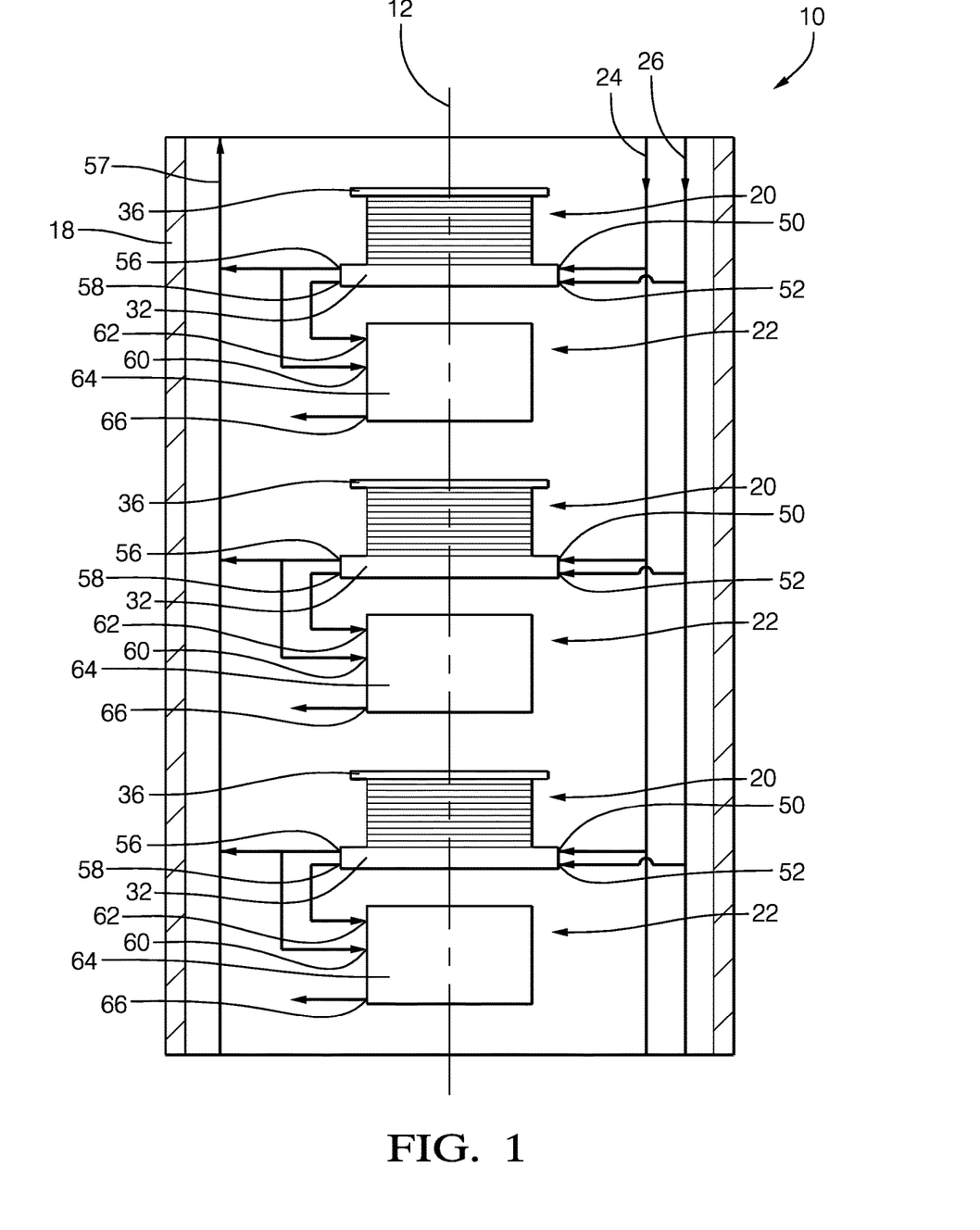
FIG. 1 is a schematic of a heater in accordance with the present invention.
Figure 2:
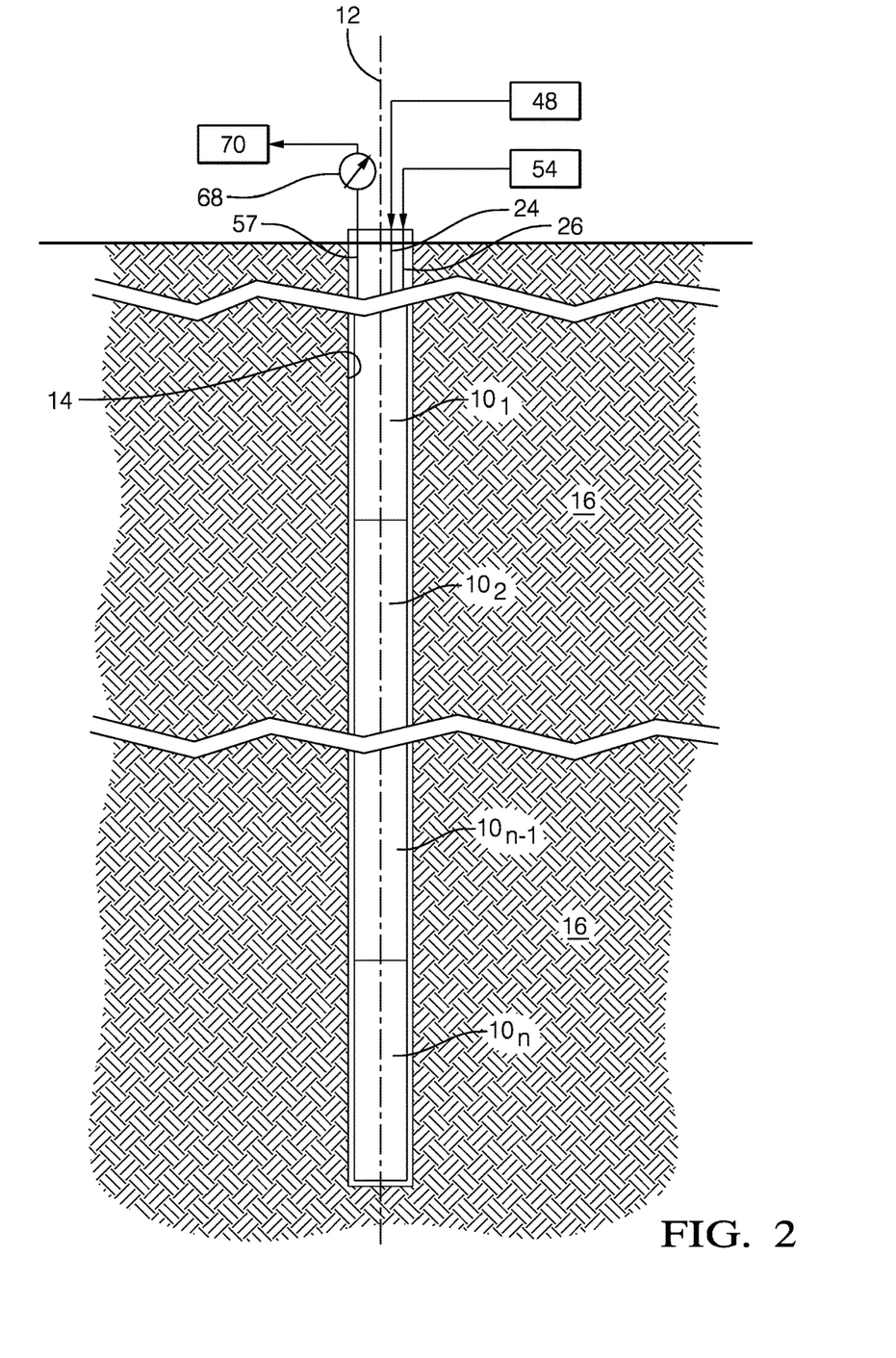
FIG. 2 is a schematic of a plurality of heaters of FIG. 1 shown in a bore hole of a geological formation.

Referring first to FIGS. 1 and 2, a heater 10 extending along a heater axis 12 is shown in accordance with the present invention. A plurality of heaters $10_1$, $10_2$, . . . $10n$-$i$, $10_n$, where n is the total number of heaters 10, may be connected together end to end within a bore hole 14 of a formation 16, for example, an oil containing geological formation, as shown in FIG. 2. Bore hole 14 may be only a few feet deep; however, may typically be several hundred feet deep to in excess of one thousand feet deep. Consequently, the number of heaters 10 needed may range from 1 to several hundred. It should be noted that the oil containing geological formation may begin as deep as one thousand feet below the surface and consequently, heater $10_1$ may be located sufficiently deep within bore hole 14 to be positioned near the beginning of the oil containing geological formation. When this is the case, units without active heating components may be positioned from the surface to heater $10_1$ in order to provide plumbing, power leads, and instrumentation leads to support and supply fuel and air to heaters $10_1$ to $10_n$.

Heater 10 generally includes a heater housing 18 extending along heater axis 12, a plurality of fuel cell stack assemblies 20 located within heater housing 18 such that each fuel cell stack assembly 20 is spaced axially apart from each other fuel cell stack assembly 20, a plurality of combustors 22 located within heater housing 18 such that combustors 22 and fuel cell stack assemblies 20 are arranged in an alternating pattern, a fuel supply conduit 24 for supplying fuel to fuel cell stack assemblies 20 and combustors 22, and an oxidizing agent supply conduit 26; hereinafter referred to as air supply conduit 26; for supplying an oxidizing agent, for example air, to fuel cell stack assemblies 20. While heater 10 is illustrated with three fuel cell stack assemblies 20 and three combustors 22 within heater housing 18, it should be understood that a lesser number or a greater number of fuel cell stack assemblies 20 and/or combustors 22 may be included. The number of fuel cell stack assemblies 20 within heater housing 18 may be determined, for example only, by one or more of the following considerations: the length of heater housing 18, the heat output capacity of each fuel cell stack assembly 20, the desired density of fuel cell stack assemblies 20 and/or combustors 22 (i.e. the number of fuel cell stack assemblies 20 and/or combustors 22 per unit of length), and the desired heat output of heater 10. The number of heaters 10 within bore hole 14 may be determined, for example only, by one or more of the following considerations: the depth of formation 16 which is desired to be heated, the location of oil within formation 16, and the length of each heater 10.

Heater housing 18 may be substantially cylindrical and hollow and may support fuel cell stack assemblies 20 and combustors 22 within heater housing 18. Heater housing 18 of heater $10_x$, where x is from 1 to n where n is the number of heaters 10 within bore hole 14, may support heaters $10_{x+1}$ to $10_n$ by heaters $10_{x+1}$ to $10_n$ hanging from heater $10_x$. Consequently, heater housing 18 may be made of a material that is substantially strong to accommodate the weight of fuel cell stack assemblies 20 and heaters $10_{x+1}$ to $10_n$. The material of heater housing 18 may also have properties to withstand the elevated temperatures, for example 600° C. to 900° C., as a result of the operation of fuel cell stack assemblies 20 and combustors 22. For example only, heater housing 18 may be made of a 300 series stainless steel with a wall thickness of 3/16 of an inch.

Figure 3:
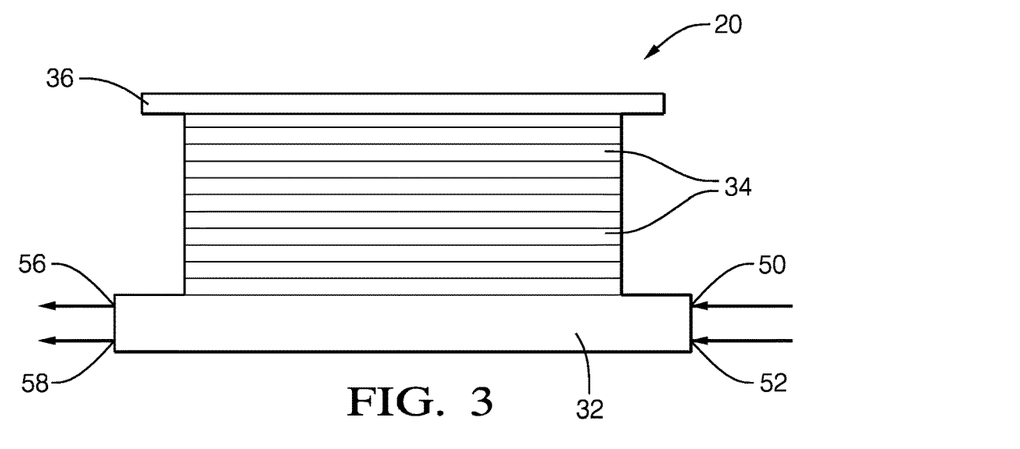
FIG. 3 is a schematic of a fuel cell stack assembly of the heater of FIG. 1.

With continued reference to FIGS. 1 and 2 and now with additional reference to FIG. 3, fuel cell stack assemblies 20 may be, for example only, solid oxide fuel cells which generally include a fuel cell manifold 32, a plurality of fuel cell cassettes 34 (for clarity, only select fuel cell cassettes 34 have been labeled), and a fuel cell end cap 36. Fuel cell cassettes 34 are stacked together between fuel cell manifold 32 and fuel cell end cap 36 in compression. Each fuel cell stack assembly 20 may include, for example only, 20 to 50 fuel cell cassettes 34.

Figure 4:
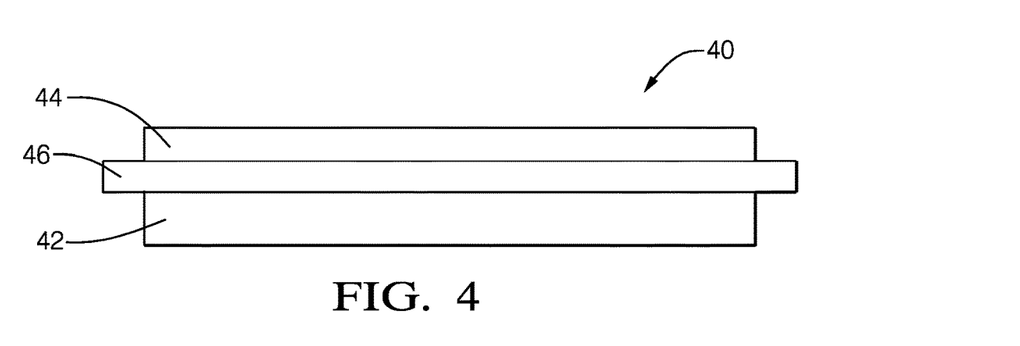
FIG. 4 is a schematic of a fuel cell of the fuel cell stack assembly of FIG. 3.

With continued reference to FIGS. 1-3 and now with additional reference to FIG. 4, each fuel cell cassette 34 includes a fuel cell 40 having an anode 42 and a cathode 44 separated by a ceramic electrolyte 46. Each fuel cell 40 converts chemical energy from a fuel cell fuel supplied to anode 42 into heat and electricity through a chemical reaction with air supplied to cathode 44. Further features of fuel cell cassettes 34 and fuel cells 40 are disclosed in United States Patent Application Publication No. US 2012/0094201 to Haltiner, Jr. et al., the disclosure of which is incorporated herein by reference in its entirety.

Now again with reference to FIGS. 1-2, fuel cell manifold 32 receives fuel, e.g. a hydrogen rich reformate which may be supplied from a fuel reformer 48, through a fuel cell fuel inlet 50 from fuel supply conduit 24 and distributes the fuel to each of the fuel cell cassettes 34. Fuel cell manifold 32 also receives an oxidizing agent, for example, air from an air supply 54, through a fuel cell air inlet 52 from air supply conduit 26. Fuel cell manifold 32 also receives anode exhaust, i.e. spent fuel and excess fuel from fuel cells 40 which may comprise $H_2$, CO, $H_2O$, $CO_2$, and $N_2$, and discharges the anode exhaust from fuel cell manifold 32 through an anode exhaust outlet 56 which is in fluid communication with an anode exhaust return conduit 57 and a respective combustor 22 as will be discussed in greater detail later. Fuel cell manifold 32 also receives cathode exhaust, i.e. spent air and excess air from fuel cells 40 which may comprise $O_2$ (depleted compared to the air supplied through air supply conduit 26) and $N_2$, and discharges the cathode exhaust from fuel cell manifold 32 through a cathode exhaust outlet 58 into a respective combustor 22 as will be described in greater detail later.

Figure 5:
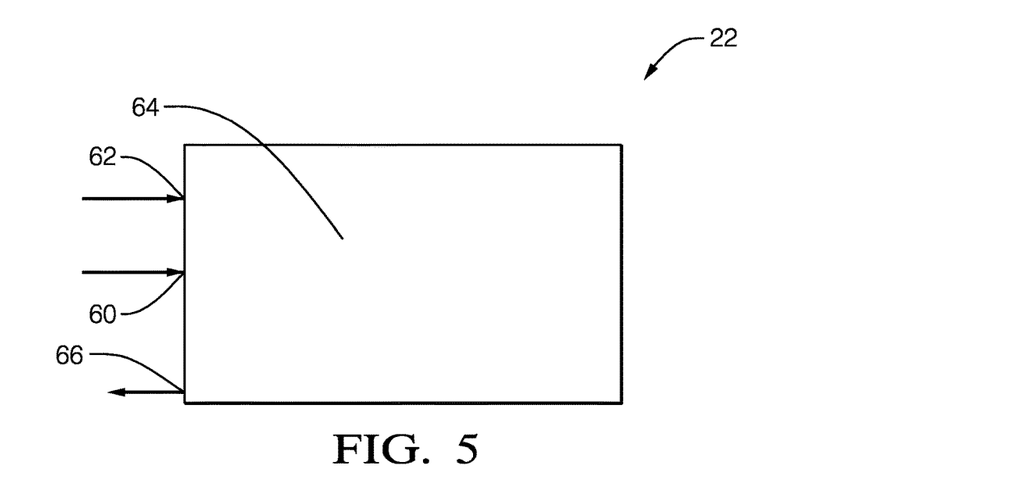
FIG. 5 is a schematic of a combustor of the heater of FIG. 1.

With continued reference to FIGS. 1 and 2 and now with additional reference to FIG. 5, each combustor 22 may include a combustor fuel inlet 60, a combustor oxidizing agent inlet 62, a combustion chamber 64, and a combustor exhaust outlet 66. Each combustor 22 may receive a combustor fuel, i.e. the anode exhaust from fuel cell stack assembly 20, through combustor fuel inlet 60. The combustor fuel is supplied to combustor 22 from fuel cell manifold 32 through anode exhaust outlet 56. Each combustor 22 may also receive a combustor oxidizing agent, for example air in the form of cathode exhaust from fuel cell stack assembly 20, through combustor oxidizing agent inlet 62. The combustor oxidizing agent is supplied to combustor 22 from fuel cell manifold 32 through cathode exhaust outlet 58. The combustor fuel and the combustor oxidizing agent are mixed within combustion chamber 64 to form a combustible mixture which is combusted to form a heated combustor exhaust. The heated combustor exhaust is discharged from combustor 22 through combustor exhaust outlet 66 into heater housing 18. Further details and features of combustor 22 are provided in U.S. patent application Ser. No. 14/013, 708 filed on Aug. 29, 2013, the disclosure of which is incorporated herein by reference in its entirety.

Anode exhaust return conduit 57 may include a valve 68 which allows a first quantity of the anode exhaust out of heaters 10, i.e. out of bore hole 14 to the surface of formation 16, and a second quantity of the anode exhaust to combustors 22. Valve 68 can be modulated, thereby adjusting the first quantity of the anode exhaust and the second quantity of anode exhaust and allowing for control of the thermal output of combustors 22 independently of the electrical output of fuel cell stack assemblies 20. The first quantity of anode exhaust that is communicated out of heaters 10 may be utilized by anode exhaust utilization device 70 which may be used, for example only, to produce steam, drive compressors, or supply a fuel reformer.

Again with reference to FIGS. 1 and 2, in use, heaters $10_1$, $10_2$, . . . $10_{n-1}$, $10_n$ are operated by supplying fuel cell fuel and fuel cell air to fuel cell stack assemblies 20 which are located within heater housing 18. Fuel cell stack assemblies 20 carry out a chemical reaction between the fuel and air, causing fuel cell stack assemblies 20 to be elevated in temperature, for example, about 600° C. to about 900° C. Anode exhaust from fuel cell stack assemblies 20 is sent to anode exhaust return conduit 57 and combustors 22 while cathode exhaust from fuel cell stack assemblies 20 is sent to combustors 22. Anode exhaust return conduit 57 communicates the anode exhaust out of heaters 10, e.g. out of bore hole 14, where the anode exhaust may be utilized by an anode exhaust utilization device 70 which may be used, for example only, to produce steam, drive compressors, or supply a fuel reformer. Valve 68 allows the proportion anode exhaust supplied to combustors 22 and anode exhaust utilization device 70 to be varied. Combustor fuel, i.e. anode exhaust, and combustor air, i.e. cathode exhaust, is supplied to combustors 22 where the combustor fuel and the combustor air is mixed and combusted to form a heated combustor exhaust which is discharged into heater housing 18. Consequently, fuel cell stack assemblies 20 together with the heated combustor exhaust elevate the temperature of heater housing 18 which subsequently elevates the temperature of formation 16.

Fuel cell stack assemblies 20 may be supported within heater housing 18 by fuel supply conduit 24, air supply conduit 26, and anode exhaust return conduit 57 as will now be described with additional reference to FIGS. 6-9. Each fuel supply conduit 24, air supply conduit 26, and anode exhaust return conduit 57 may be supported by a support plate 72 located at the lower end of heater housing 18. Support plate 72 is of sufficient strength and securely fastened to heater housing 18 in order support the weight of fuel cell stack assemblies 20, combustors 22, fuel supply conduit 24, air supply conduit 26, and anode exhaust return conduit 57 that are located within heater 10. Support plate 90 is arranged to allow the heated combustor exhaust from heaters $10_{x+1}$-$10_n$ to rise through heater housing 18 of heater $10_x$, much like a chimney, ultimately allowing the heated combustor exhaust to pass to the surface of formation 16. Support plate 90 is also arranged to allow fuel supply conduit 24, air supply conduit 26, and anode exhaust return conduit 57 of heater $10_x$ to fluidly couple with fuel supply conduit 24, air supply conduit 26, and anode exhaust return conduit 57 of adjacent heaters $10_{x-1}$ and $10_{x+1}$. The paragraphs that follow will describe how each fuel cell stack assembly 20 is supported by fuel supply conduit 24, air supply conduit 26, and anode exhaust return conduit 57.

Figure 6:
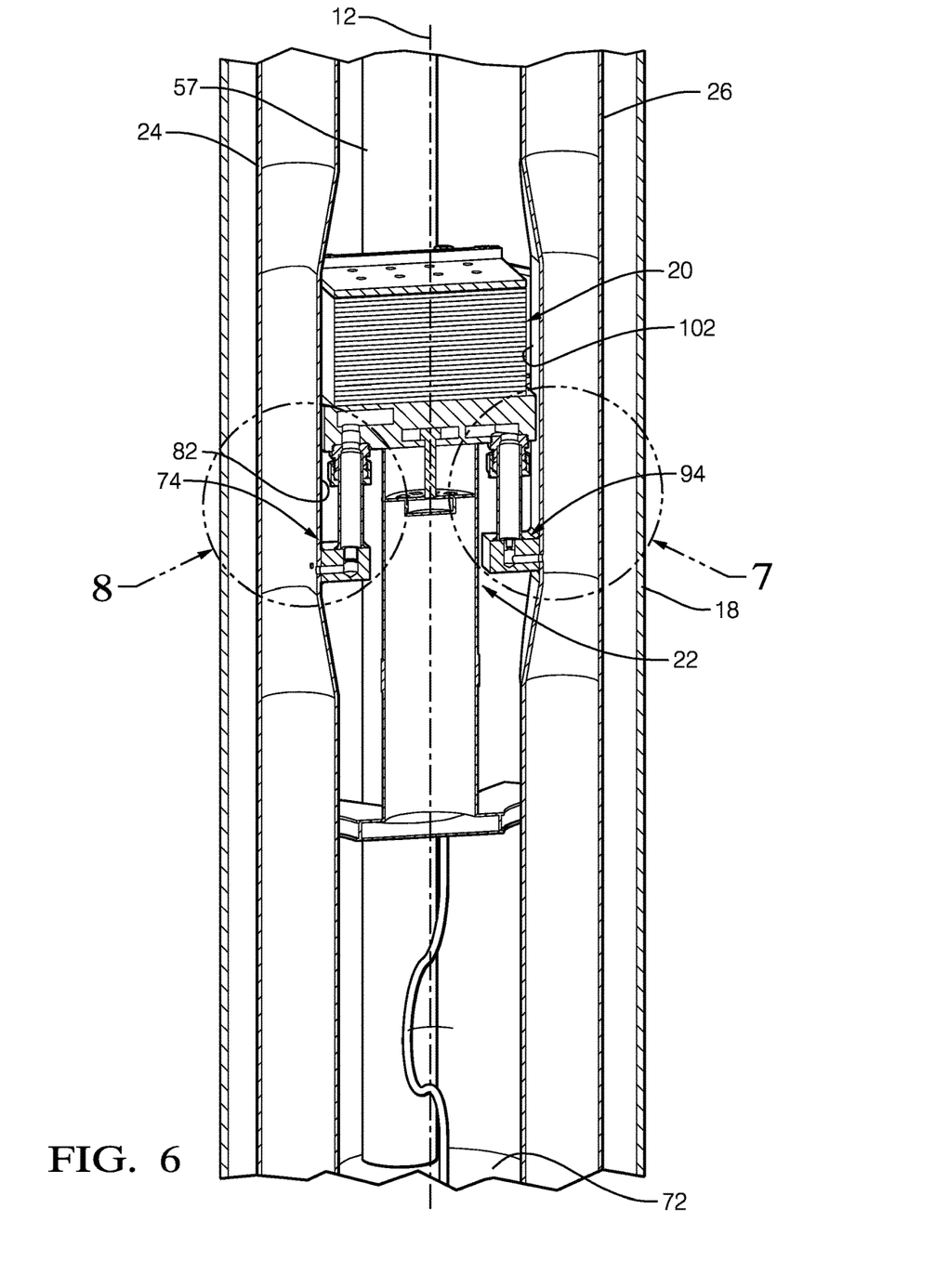
FIG. 6 is a isometric cutaway view of a portion of the heater in accordance with the present invention.
Figure 7:
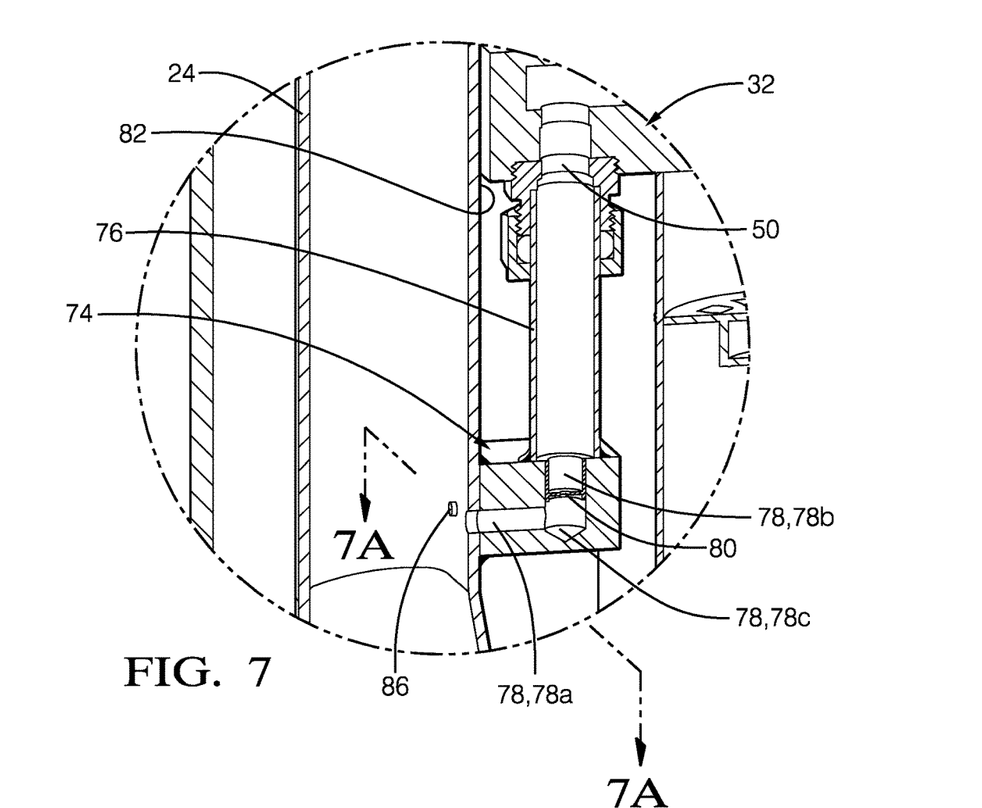
FIG. 7 is a axial cross-sectional view of a fuel supply conduit shelf of the heater in accordance with the present invention.
Figure 7A:
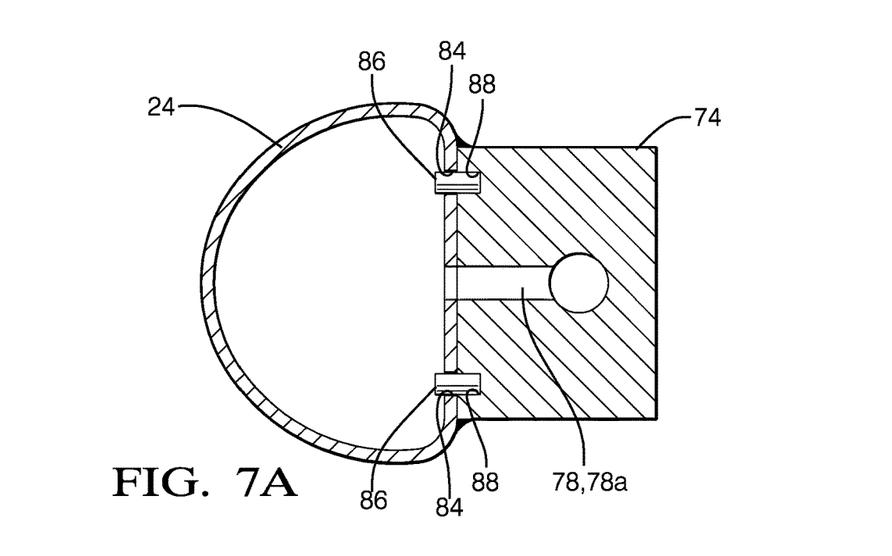
FIG. 7A is a radial cross-sectional view taken through section line 7A-7A of FIG. 7.

Now as shown in FIGS. 6, 7, and 7A, fuel supply conduit 24 includes a fuel supply conduit shelf 74 which extends laterally outward from fuel supply conduit 24 and which faces upward such that fuel cell manifold 32 is supported on fuel supply conduit shelf 74. As embodied herein, a fuel supply intermediate conduit 76 is disposed between fuel cell fuel inlet 50 of fuel cell manifold 32 and fuel supply conduit shelf 74. Fuel supply intermediate conduit 76 may be substantially parallel to heater axis 12 such that one end of fuel supply intermediate conduit 76 is fixed to fuel supply conduit shelf 74 in a fluid tight manner, by way of non-limiting example only, by a braze or weld connection and such that the other end of fuel supply intermediate conduit 76 is fixed to fuel cell fuel inlet 50 in a fluid tight manner, by way of non-limiting example only, with a threaded coupling. Also as embodied herein, fuel supply conduit shelf 74 is a block that is fabricated independently of fuel supply conduit 24 and subsequently fixed to fuel supply conduit 24 in a fluid tight manner, by way of non-limited example only, by a braze or weld connection. Fuel supply conduit shelf 74 is preferably made of a material to minimize differences in coefficient of thermal expansion between fuel supply conduit 24 and fuel supply conduit shelf 74.

A fuel supply conduit shelf passage 78 is defined through the wall of fuel supply conduit 24 and through fuel supply conduit shelf 74, thereby providing fluid communication between fuel supply conduit 24 and fuel supply intermediate conduit 76. Fuel supply conduit shelf passage 78 includes a fuel supply conduit shelf passage first section 78a which extends through the wall of fuel supply conduit 24 and into fuel supply conduit shelf 74 in a direction that is substantially perpendicular to heater axis 12. Fuel supply conduit shelf passage 78 also includes a fuel supply conduit shelf passage second section 78b which extends from fuel supply conduit shelf passage first section 78a to fuel supply intermediate conduit 76 in a direction that is substantially parallel to heater axis 12. Fuel supply conduit shelf passage 78 also includes a fuel supply conduit shelf passage sediment trap 78c which extends away from fuel supply conduit shelf passage first section 78a in a direction that is opposite fuel supply conduit shelf passage second section 78b, thereby defining a low point in fuel supply conduit shelf passage 78 into which foreign matter present in the fuel cell fuel may settle. A fuel supply orifice 80 is located within fuel supply conduit shelf passage second section 78b which provides a predetermined magnitude of restriction within fuel supply conduit shelf passage 78 in order to regulate the flow of fuel to fuel cell stack assembly 20. The orientation of fuel supply orifice 80 within fuel supply conduit shelf passage second section 78b, i.e. vertically oriented, together with fuel supply conduit shelf passage sediment trap 78c helps to minimize or eliminate plugging of fuel supply orifice 80 over the service life of heater 10. Further features of fuel supply orifice 80 are provided in U.S. patent application Ser. No. 14/013,818 to Fischer et al., the disclosure of which is incorporated herein by reference in its entirety.

In order to simplify assembly, fuel supply conduit 24 may include a fuel supply conduit flat 82 which is planar and which extends along at least a portion of fuel supply conduit 24 while the remainder of the perimeter of fuel supply conduit 24 is the contour of a cylinder. Fuel supply conduit flat 82 may extend sufficiently far along the length of fuel supply conduit 24 to accommodate fuel cell stack assembly 20. Fuel supply conduit flat 82 allows the mating surface of fuel supply conduit shelf 74 to be planar, thereby eliminating the need to match non-planar surfaces. Also in order to simplify assembly, fuel supply conduit 24 may include one or more fuel supply conduit alignment holes 84 in fuel supply conduit flat 82 within which are located one end of complementary fuel supply conduit shelf alignment pins 86. The other end of fuel supply conduit shelf alignment pins 86 are located within complementary fuel supply conduit shelf alignment holes 88. In this way, fuel supply conduit shelf 74 can be precisely located on fuel supply conduit 24 using fuel supply conduit alignment holes 84, fuel supply conduit shelf alignment holes 88, and fuel supply conduit shelf alignment pins 86 such that fuel supply conduit shelf alignment pins 86 maintain this position until fuel supply conduit shelf 74 can be fixed to fuel supply conduit 24, for example, by brazing or welding.

Figure 8:
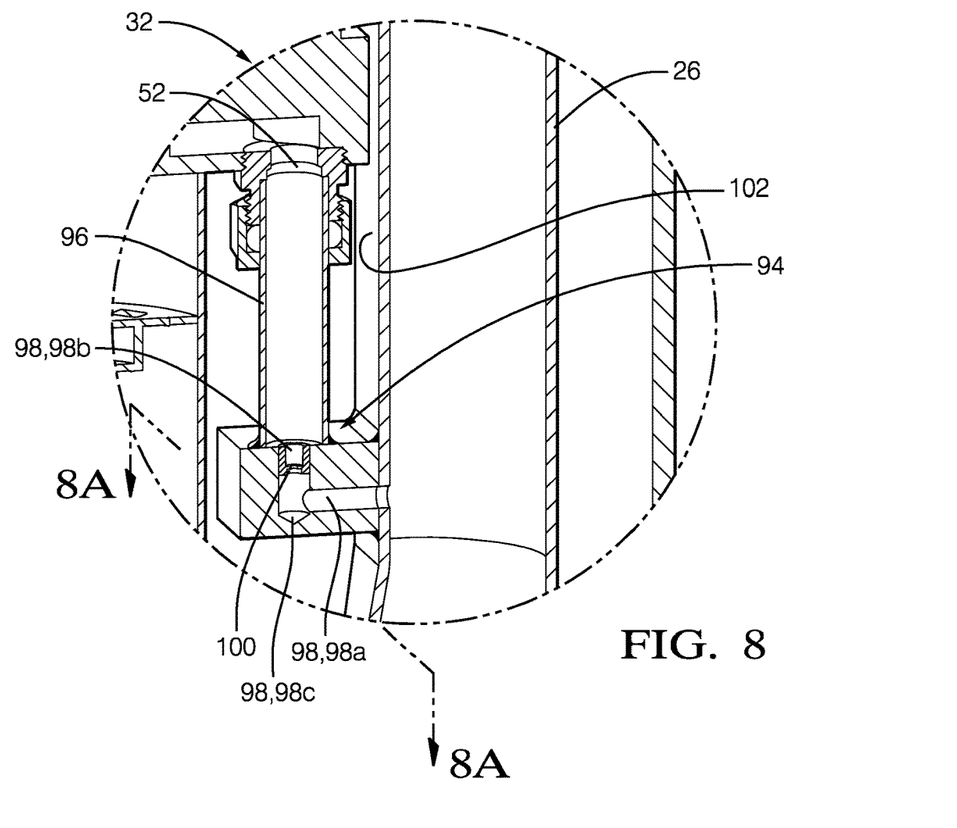
FIG. 8 is a axial cross-sectional view of an air supply conduit shelf of the heater in accordance with the present invention.
Figure 8A:
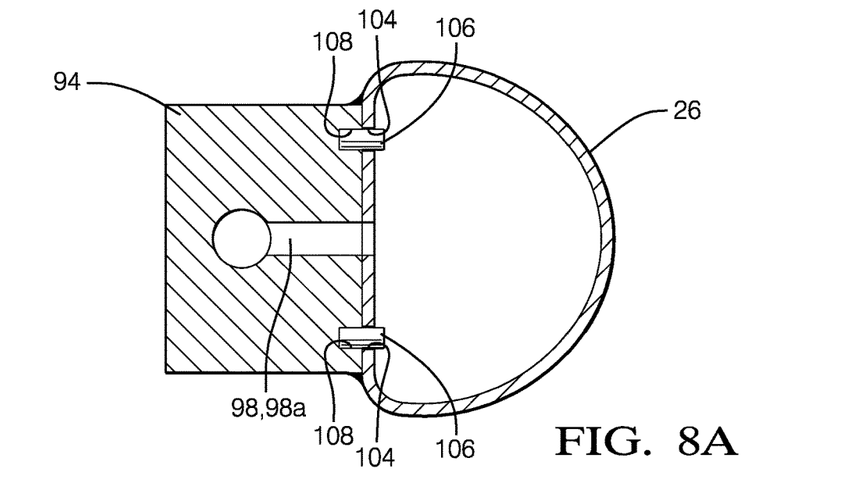
FIG. 8A is a radial cross-sectional view taken through section line 8A-8A of FIG. 8.

Now as shown in FIGS. 6, 8, and 8A, air supply conduit 26 includes an oxidizing agent supply conduit shelf 94, hereinafter referred to as air supply conduit shelf 94, which extends laterally outward from air supply conduit 26 and which faces upward such that fuel cell manifold 32 is supported on air supply conduit shelf 94. As embodied herein, an oxidizing agent supply intermediate conduit 96, hereinafter referred to as air supply intermediate conduit 96, is disposed between fuel cell air inlet 52 of fuel cell manifold 32 and air supply conduit shelf 94. Air supply intermediate conduit 96 may be substantially parallel to heater axis 12 such that one end of air supply intermediate conduit 96 is fixed to air supply conduit shelf 94 in a fluid tight manner, by way of non-limiting example only, by a braze or weld connection and such that the other end of air supply intermediate conduit 96 is fixed to fuel cell air inlet 52 in a fluid tight manner, by way of non-limiting example only, with a threaded coupling. Also as embodied herein, air supply conduit shelf 94 is a block that is fabricated independently of air supply conduit 26 and subsequently fixed to air supply conduit 26 in a fluid tight manner, by way of non-limited example only, by a braze or weld connection. Air supply conduit shelf 94 is preferably made of a material to minimize differences in coefficient of thermal expansion between air supply conduit 26 and air supply conduit shelf 94.

An oxidizing agent supply conduit shelf passage 98, herein after referred to as air supply conduit shelf passage 98, is defined through the wall of air supply conduit 26 and through air supply conduit shelf 94, thereby providing fluid communication between air supply conduit 26 and air supply intermediate conduit 96. Air supply conduit shelf passage 98 includes an oxidizing agent supply conduit shelf passage first section 98a, herein after referred to as air supply conduit shelf passage first section 98a, which extends through the wall of air supply conduit 26 and into air supply conduit shelf 94 in a direction that is substantially perpendicular to heater axis 12. Air supply conduit shelf passage 98 also includes an oxidizing agent supply conduit shelf passage second section 98b, herein after referred to as air supply conduit shelf passage second section 98b, which extends from air supply conduit shelf passage first section 98a to air supply intermediate conduit 96 in a direction that is substantially parallel to heater axis 12. Air supply conduit shelf passage 98 also includes an oxidizing agent supply conduit shelf passage sediment trap 98c, herein after referred to as air supply conduit shelf passage sediment trap 98c, which extends away from air supply conduit shelf passage first section 98a in a direction that is opposite air supply conduit shelf passage second section 98b, thereby defining a low point in air supply conduit shelf passage 98 into which foreign matter present in the fuel may settle. An oxidizing agent supply orifice 100, hereinafter referred to as air supply orifice 100, is located within air supply conduit shelf passage second section 98b which provides a predetermined magnitude of restriction within air supply conduit shelf passage 98 in order to regulate the flow of air to fuel cell stack assembly 20. The orientation of air supply orifice 100 within air supply conduit shelf passage second section 98b, i.e. vertically oriented, together with air supply conduit shelf passage sediment trap 98c helps to minimize or eliminate plugging of air supply orifice 100 over the service life of heater 10. Further features of air supply orifice 100 are provided in U.S. patent application Ser. No. 14/013,818 to Fischer et al., the disclosure of which is incorporated herein by reference in its entirety.

In order to simplify assembly, air supply conduit 26 may include an air supply conduit flat 102 which is planar and which extends along at least a portion of air supply conduit 26 while the remainder of the perimeter of air supply conduit 26 is the contour of a cylinder. Air supply conduit flat 102 may extend sufficiently far along the length of air supply conduit 26 to accommodate fuel cell stack assembly 20. Air supply conduit flat 102 allows the mating surface of air supply conduit shelf 94 to be planar, thereby eliminating the need to match non-planar surfaces. Also in order to simplify assembly, air supply conduit 26 may include one or more air supply conduit alignment holes 104 in air supply conduit flat 102 within which are located one end of complementary air supply conduit shelf alignment pins 106. The other end of air supply conduit shelf alignment pins 106 are located within complementary air supply conduit shelf alignment holes 108. In this way, air supply conduit shelf 94 can be precisely located on air supply conduit 26 using air supply conduit alignment holes 104, air supply conduit shelf alignment holes 108, and air supply conduit shelf alignment pins 106 such that air supply conduit shelf alignment pins 106 maintain this position until air supply conduit shelf 94 can be fixed to air supply conduit 26, for example, by brazing or welding.

Figure 9:
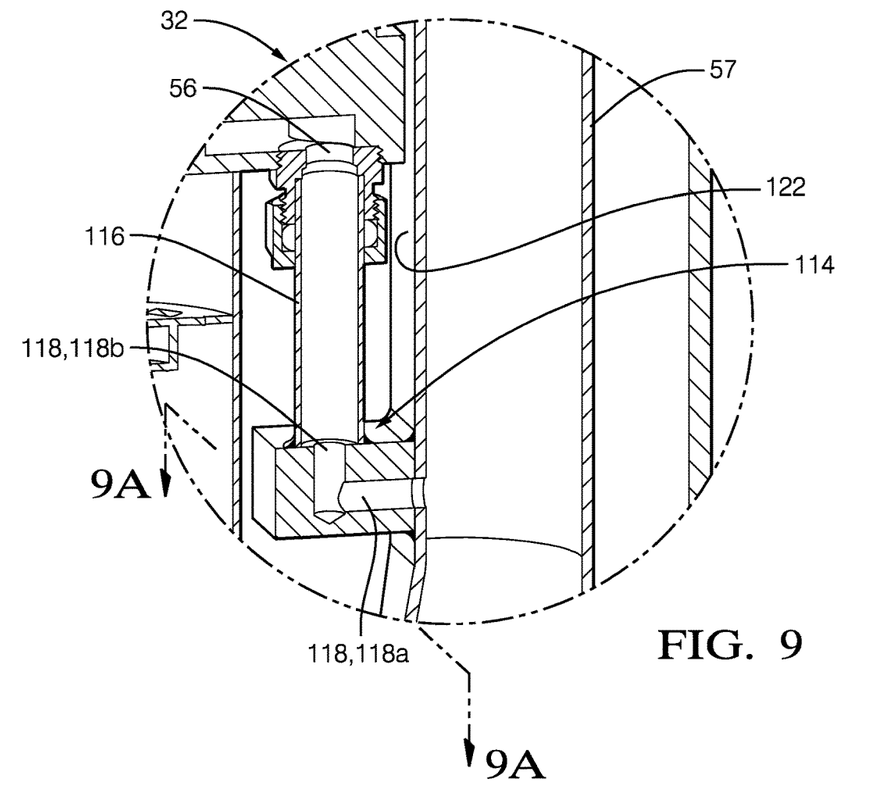
FIG. 9 is an axial cross-sectional view of an anode exhaust return conduit shelf of the heater in accordance with the present invention.
Figure 9A:
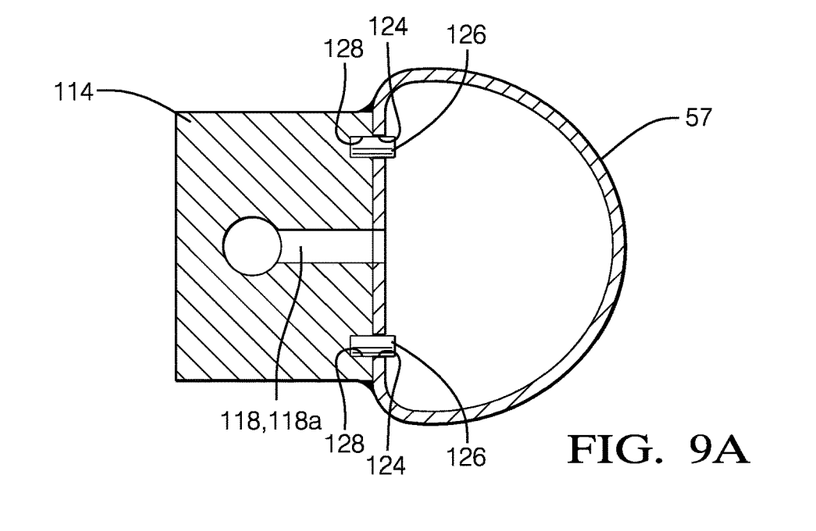
FIG. 9A is a radial cross-sectional view taken through section line 9A-9A of FIG. 9.

Now as shown in FIGS. 6, 9, and 9A, anode exhaust return conduit 57 includes an anode exhaust return conduit shelf 114 which extends laterally outward from anode exhaust return conduit 57 and which faces upward such that fuel cell manifold 32 is supported on anode exhaust return conduit shelf 114. As embodied herein, an anode exhaust intermediate conduit 116 is disposed between anode exhaust outlet 56 of fuel cell manifold 32 and anode exhaust return conduit shelf 114. Anode exhaust intermediate conduit 116 may be substantially parallel to heater axis 12 such that one end of anode exhaust intermediate conduit 116 is fixed to anode exhaust return conduit shelf 114 in a fluid tight manner, by way of non-limiting example only, by a braze or weld connection and such that the other end of anode exhaust intermediate conduit 116 is fixed to anode exhaust outlet 56 in a fluid tight manner, by way of non-limiting example only, with a threaded coupling. Also as embodied herein, anode exhaust return conduit shelf 114 is a block that is fabricated independently of anode exhaust return conduit 57 and subsequently fixed to anode exhaust return conduit 57 in a fluid tight manner, by way of non-limited example only, by a braze or weld connection. Anode exhaust return conduit shelf 114 is preferably made of a material to minimize differences in coefficient of thermal expansion between anode exhaust return conduit 57 and anode exhaust return conduit shelf 114.

An anode exhaust return conduit shelf passage 118 is defined through the wall of anode exhaust return conduit 57 and through anode exhaust return conduit shelf 114, thereby providing fluid communication between anode exhaust return conduit 57 and anode exhaust intermediate conduit 116. Anode exhaust return conduit shelf passage 118 includes an anode exhaust return conduit shelf passage first section 118a which extends through the wall of anode exhaust return conduit 57 and into anode exhaust return conduit shelf 114 in a direction that is substantially perpendicular to heater axis 12. Anode exhaust return conduit shelf passage 118 also includes an anode exhaust return conduit shelf passage second section 118b which extends from anode exhaust return conduit shelf passage first section 118a to anode exhaust intermediate conduit 116 in a direction that is substantially parallel to heater axis 12.

In order to simplify assembly, anode exhaust return conduit 57 may include an anode exhaust return conduit flat 122 which is planar and which extends along at least a portion of anode exhaust return conduit 57 while the remainder of the perimeter of anode exhaust return conduit 57 is the contour of a cylinder. Anode exhaust return conduit flat 122 may extend sufficiently far along the length of anode exhaust return conduit 57 to accommodate fuel cell stack assembly 20. Anode exhaust return conduit flat 122 allows the mating surface of anode exhaust return conduit shelf 114 to be planar, thereby eliminating the need to match non-planar surfaces. Also in order to simplify assembly anode exhaust return conduit 57 may include one or more anode exhaust return conduit alignment holes 124 in anode exhaust return conduit flat 122 within which are located one end of complementary anode exhaust return conduit shelf alignment pins 126. The other end of anode exhaust return conduit shelf alignment pins 126 are located within complementary anode exhaust return conduit shelf alignment holes 128. In this way, anode exhaust return conduit shelf 114 can be precisely located on anode exhaust return conduit 57 using anode exhaust return conduit alignment holes 124, anode exhaust return conduit shelf alignment holes 128, and anode exhaust return conduit shelf alignment pins 126 such that anode exhaust return conduit shelf alignment pins 126 maintain this position until anode exhaust return conduit shelf 114 can be fixed to anode exhaust return conduit 57, for example, by brazing or welding.

Fuel supply conduit shelf 74, air supply conduit shelf 94, anode exhaust return conduit shelf 114 cooperate to support a respective fuel cell stack assembly 20, and consequently support a respective combustor 22 since combustors 22 hang from fuel cell stack assemblies 20. It should not be readily apparent that respective fuel supply conduit shelves 74, air supply conduit shelves 94, and anode exhaust return conduit shelves 114 are provided for supporting each fuel cell stack assembly 20. Fuel supply conduit shelf 74, air supply conduit shelf 94, anode exhaust return conduit shelf 114 minimize the size of connections from fuel supply conduit 24, air supply conduit 26, and anode exhaust return conduit 57 to or from fuel cell stack assembly 20 since each fuel supply conduit shelf 74, air supply conduit shelf 94, anode exhaust return conduit shelf 114 needs to provide sufficient flow to support only one fuel cell stack assembly 20. Fuel supply conduit shelf 74, air supply conduit shelf 94, anode exhaust return conduit shelf 114 also minimize the number of connections made with their respective fuel cell stack assembly 20 since fuel cell stack assemblies 20 are arranged to be in parallel with fuel supply conduit 24, air supply conduit 26, and anode exhaust return conduit 57.

While heater 10 has been embodied herein as supporting each fuel cell stack assembly 20 by fuel supply conduit 24, air supply conduit 26, and anode exhaust return conduit 57, it should now be understood that each fuel cell stack assembly may be supported by a lesser number of conduits or a greater number of conduits. Fuel supply conduit 24, air supply conduit 26, and anode exhaust return conduit 57 can be generically referred to as medium conduits which are in fluid communication with fuel cell stack assemblies 20. Any combination of these medium conduits may include shelves which support fuel cell stack assemblies 20. Additional medium conduits may also be provided which serve to support fuel cell stack assemblies 20. For example, any or all of fuel supply conduit 24, air supply conduit 26, and anode exhaust return conduit 57 may be duplicated in order to increase flow capacity. Also for example, a cathode exhaust return conduit may be provided to return cathode exhaust from fuel cell stack assemblies 20 to the surface of formation 16. Any of these additional medium conduits may also include shelves upon which fuel cell stack assemblies 20 may be additionally supported.

While this invention has been described in terms of preferred embodiments thereof, it is not intended to be so limited, but rather only to the extent set forth in the claims that follow.

We claim:

1. A heater comprising:
a heater housing extending along a heater axis;
a fuel cell stack assembly disposed within said heater housing and having a fuel cell manifold supporting a plurality of fuel cells which convert chemical energy from a fuel into heat and electricity through a chemical reaction with an oxidizing agent;
a first medium conduit fixed relative to said heater housing and in fluid communication with said fuel cell stack assembly, said first medium conduit including a first medium conduit shelf extending laterally from said first medium conduit and facing upward, said first medium conduit shelf controlling an inlet flow of a first medium into said fuel cell manifold;
a second medium conduit fixed relative to said heater housing and in fluid communication with said fuel cell stack assembly, said second medium conduit including a second medium conduit shelf extending laterally from said second medium conduit and facing upward, said second medium conduit shelf controlling an inlet flow of a second medium into said fuel cell manifold;
wherein said fuel cell manifold is supported on said first medium conduit shelf and said second medium conduit shelf.

2. The heater as in claim 1 wherein:
said first medium conduit is a fuel supply conduit which supplies said fuel to said fuel cell stack assembly;
said first medium conduit shelf is a fuel supply conduit shelf;
said second medium conduit is an oxidizing agent supply conduit which supplies said oxidizing agent to said fuel cell stack assembly; and
said second medium conduit shelf is an oxidizing agent supply conduit shelf.

3. The heater as in claim 2 wherein said fuel cell manifold 1) receives said fuel from said fuel supply conduit and distributes said fuel to said plurality of fuel cells and 2) receives said oxidizing agent from said oxidizing agent supply conduit and distributes said oxidizing agent to said plurality of fuel cells.

4. The heater as in claim 3 wherein:
said fuel supply conduit shelf defines a fuel supply conduit shelf passage which in part communicates said fuel from said fuel supply conduit to said fuel cell manifold; and
said oxidizing agent supply conduit shelf defines an oxidizing agent supply conduit shelf passage which in part communicates said oxidizing agent from said oxidizing agent supply conduit to said fuel cell manifold.

5. The heater as in claim 4 wherein:
a fuel supply intermediate conduit is located between said fuel supply conduit shelf and said fuel cell manifold, thereby providing fluid communication from said fuel supply conduit shelf passage to said fuel cell manifold; and
an oxidizing agent supply intermediate conduit is located between said oxidizing agent supply conduit shelf and said fuel cell manifold, thereby providing fluid communication from said oxidizing agent supply conduit shelf passage to said fuel cell manifold.

6. The heater as in claim 5 wherein:
said fuel supply intermediate conduit is parallel to said heater axis; and
said oxidizing agent supply intermediate conduit is parallel to said heater axis.

7. The heater as in claim 5 wherein:
said fuel supply conduit shelf passage includes a fuel supply conduit shelf passage first section which is substantially perpendicular to said heater axis and also includes a fuel supply conduit shelf passage second section which extends from said fuel supply conduit shelf passage first section in a direction that is substantially parallel to said heater axis such that said fuel supply conduit shelf passage second section provides fluid communication from said fuel supply conduit shelf passage first section to said fuel supply intermediate conduit; and said oxidizing agent supply conduit shelf passage includes an oxidizing agent supply conduit shelf passage first section which is substantially perpendicular to said heater axis and also includes an oxidizing agent supply conduit shelf passage second section which extends from said oxidizing agent supply conduit shelf passage first section in a direction that is substantially parallel to said heater axis such that said oxidizing agent supply conduit shelf passage second section provides fluid communication from said oxidizing agent supply conduit shelf passage first section to said oxidizing agent supply intermediate conduit.

8. The heater as in claim 7 wherein:
a fuel supply orifice is disposed within said fuel supply conduit shelf passage second section such that said fuel supply orifice provides a predetermined magnitude of restriction, thereby regulating flow of said fuel to said fuel cell stack assembly; and
an oxidizing agent supply orifice is disposed within said oxidizing agent supply conduit shelf passage second section such that said oxidizing agent supply orifice provides a predetermined magnitude of restriction, thereby regulating flow of said oxidizing agent to said fuel cell stack assembly.

9. The heater as is claim 7 wherein:
said fuel supply conduit shelf passage also includes a fuel supply conduit shelf passage sediment trap which extends from said fuel supply conduit shelf passage first section in a direction that is opposite of said fuel supply conduit shelf passage second section; and
said oxidizing agent supply conduit shelf passage also includes an oxidizing agent supply conduit passage sediment trap which extends from said oxidizing agent supply conduit shelf passage first section in a direction that is opposite of said oxidizing agent supply conduit shelf passage second section.

10. The heater as in claim 1 further comprising a third medium conduit fixed relative to said heater housing and in fluid communication with said fuel cell stack assembly, said third medium conduit including a third medium conduit shelf extending laterally from said third medium conduit and facing upward; wherein said fuel cell manifold is supported on said first medium conduit shelf, said second medium conduit shelf, and said third medium conduit shelf.

11. The heater as in claim 10 wherein:
said first medium conduit is a fuel supply conduit which supplies said fuel to said fuel cell stack assembly;
said first medium conduit shelf is a fuel supply conduit shelf;
said second medium conduit is an oxidizing agent supply conduit which supplies said oxidizing agent to said fuel cell stack assembly;
said second medium conduit shelf is an oxidizing agent supply conduit shelf;
said third medium conduit is an anode exhaust return conduit which communicates anode exhaust from said fuel cell stack assembly out of said heater housing; and
said third medium conduit shelf is an anode exhaust return conduit shelf.

12. The heater as in claim 11 wherein said fuel cell manifold which 1) receives said fuel from said fuel supply conduit and distributes said fuel to said plurality of fuel cells, 2) receives said oxidizing agent from said oxidizing agent supply conduit and distributes said oxidizing agent to said plurality of fuel cells, and 3) receives said anode exhaust from said plurality of fuel cells.

13. The heater as in claim 12 wherein:
said fuel supply conduit shelf defines a fuel supply conduit shelf passage which in part communicates said fuel from said fuel supply conduit to said fuel cell manifold;
said oxidizing agent supply conduit shelf defines an oxidizing agent supply conduit shelf passage which in part communicates said oxidizing agent from said oxidizing agent supply conduit to said fuel cell manifold; and
said anode exhaust return conduit shelf defines an anode exhaust return conduit shelf passage which in part communicates said anode exhaust from said fuel cell manifold to said anode exhaust return conduit.

14. The heater as in claim 13 wherein:
a fuel supply intermediate conduit is located between said fuel supply conduit shelf and said fuel cell manifold, thereby providing fluid communication from said fuel supply conduit shelf passage to said fuel cell manifold;
an oxidizing agent supply intermediate conduit is located between said oxidizing agent supply conduit shelf and said fuel cell manifold, thereby providing fluid communication from said oxidizing agent supply conduit shelf passage to said fuel cell manifold; and
an anode exhaust intermediate conduit is located between said anode exhaust return conduit shelf and said fuel cell manifold, thereby providing fluid communication from said fuel cell manifold to said anode exhaust return conduit shelf passage.

15. The heater as in claim 14 wherein:
said fuel supply intermediate conduit is parallel to said heater axis;
said oxidizing agent supply intermediate conduit is parallel to said heater axis; and
said anode exhaust intermediate conduit is parallel to said heater axis.

16. The heater as in claim 14 wherein:
said fuel supply conduit shelf passage includes a fuel supply conduit shelf passage first section which is substantially perpendicular to said heater axis and also includes a fuel supply conduit shelf passage second section which extends from said fuel supply conduit shelf passage first section in a direction that is substantially parallel to said heater axis such that said fuel supply conduit shelf passage second section provides fluid communication from said fuel supply conduit shelf passage first section to said fuel supply intermediate conduit;
said oxidizing agent supply conduit shelf passage includes an oxidizing agent supply conduit shelf passage first section which is substantially perpendicular to said heater axis and also includes an oxidizing agent supply conduit shelf passage second section which extends from said oxidizing agent supply conduit shelf passage first section in a direction that is substantially parallel to said heater axis such that said oxidizing agent supply conduit shelf passage second section provides fluid communication from said oxidizing agent supply conduit shelf passage first section to said oxidizing agent supply intermediate conduit; and said anode exhaust return conduit shelf passage includes an anode exhaust return conduit shelf passage first section which is substantially perpendicular to said heater axis and also includes an anode exhaust return conduit shelf passage second section which extends from said anode exhaust return conduit shelf passage first section in a direction that is substantially parallel to said heater axis such that said anode exhaust return conduit shelf passage second section provides fluid communication from said anode exhaust intermediate conduit to said anode exhaust return conduit shelf passage first section.

17. The heater as in claim 16 wherein:
a fuel supply orifice is disposed within said fuel supply conduit shelf passage second section such that said fuel supply orifice provides a predetermined magnitude of restriction, thereby regulating flow of said fuel to said fuel cell stack assembly; and
an oxidizing agent supply orifice is disposed within said oxidizing agent supply conduit shelf passage second section such that said oxidizing agent supply orifice provides a predetermined magnitude of restriction, thereby regulating flow of said oxidizing agent to said fuel cell stack assembly.

18. The heater as is claim 16 wherein:
said fuel supply conduit shelf passage also includes a fuel supply conduit shelf passage sediment trap which extends from said fuel supply conduit shelf passage first section in a direction that is opposite of said fuel supply conduit shelf passage second section; and
said oxidizing agent supply conduit shelf passage also includes an oxidizing agent supply conduit passage sediment trap which extends from said oxidizing agent supply conduit shelf passage first section in a direction that is opposite of said oxidizing agent supply conduit shelf passage second section.

19. The heater as in claim 1 wherein:
said fuel cell stack assembly is one of a plurality of fuel cell stack assemblies disposed within said heater housing such that each one of said plurality of fuel cell stack assemblies is positioned axially with respect to every other of said plurality of fuel cell stack assemblies;
said first medium conduit shelf is one of a plurality of first medium conduit shelves;
said second medium conduit shelf is one of a plurality of second medium conduit shelves; and
each of said plurality of fuel cell stack assemblies is supported on respective ones of said plurality of first medium conduit shelves and said plurality of second medium conduit shelves.

20. The heater as in claim 19 further comprising a third medium conduit fixed relative to said heater housing and in fluid communication with said fuel cell stack assembly, said third medium conduit including a plurality of third medium conduit shelves extending laterally from said third medium conduit; wherein each of said plurality of fuel cell stack assemblies is supported on respective ones of said plurality of first medium conduit shelves, said plurality of second medium conduit shelves, and said plurality of third medium conduit shelves.

21. The heater as in claim 20 wherein:
said first medium conduit is a fuel supply conduit which supplies said fuel to said plurality of fuel cell stack assemblies;

said plurality of first medium conduit shelves is a plurality of fuel supply conduit shelves;
said second medium conduit is an oxidizing agent supply conduit which supplies said oxidizing agent to said plurality of fuel cell stack assemblies;
said plurality of second medium conduit shelves is a plurality of oxidizing agent supply conduit shelves;
said third medium conduit is an anode exhaust return conduit which communicates anode exhaust from said plurality of fuel cell stack assemblies out of said heater housing; and
said plurality of third medium conduit shelves is a plurality of anode exhaust return conduit shelves.

22. The heater as in claim 21 wherein each of said plurality of fuel cell stack assemblies includes the fuel cell manifold which 1) receives said fuel from said fuel supply conduit and distributes said fuel to said plurality of fuel cells, 2) receives said oxidizing agent from said oxidizing agent supply conduit and distributes said oxidizing agent to said plurality of fuel cells, and 3) receives said anode exhaust from said plurality of fuel cells.

23. The heater as in claim 22 wherein:
each of said plurality of fuel supply conduit shelves defines a fuel supply conduit shelf passage which in part communicates said fuel from said fuel supply conduit to a respective said fuel cell manifold;
each of said plurality of oxidizing agent supply conduit shelves defines an oxidizing agent supply conduit shelf passage which in part communicates said oxidizing agent from said oxidizing agent supply conduit to a respective said fuel cell manifold; and
each of said plurality of anode exhaust return conduit shelves defines an anode exhaust return conduit shelf passage which in part communicates said anode exhaust from a respective said fuel cell manifold to said anode exhaust return conduit.

24. The heater as in claim 23 wherein:
a fuel supply intermediate conduit is located between each of said plurality of fuel supply conduit shelves and a respective said fuel cell manifold, thereby providing fluid communication from said fuel supply conduit shelf passage to said fuel cell manifold;
an oxidizing agent supply intermediate conduit is located between each of said plurality of oxidizing agent supply conduit shelves and a respective said fuel cell manifold, thereby providing fluid communication from said oxidizing agent supply conduit shelf passage to said fuel cell manifold; and
an anode exhaust intermediate conduit is located between each of said plurality of anode exhaust return conduit shelves and a respective said fuel cell manifold, thereby providing fluid communication from said fuel cell manifold to said anode exhaust return conduit shelf passage.

25. The heater as in claim 24 wherein:
said fuel supply intermediate conduit is parallel to said heater axis;
said oxidizing agent supply intermediate conduit is parallel to said heater axis; and
said anode exhaust intermediate conduit is parallel to said heater axis.

26. The heater as in claim 24 wherein:
said fuel supply conduit shelf passage includes a fuel supply conduit shelf passage first section which is substantially perpendicular to said heater axis and also includes a fuel supply conduit shelf passage second section which extends from said fuel supply conduit shelf passage first section in a direction that is substantially parallel to said heater axis such that said fuel supply conduit shelf passage second section provides fluid communication from said fuel supply conduit shelf passage first section to said fuel supply intermediate conduit;

said oxidizing agent supply conduit shelf passage includes an oxidizing agent supply conduit shelf passage first section which is substantially perpendicular to said heater axis and also includes an oxidizing agent supply conduit shelf passage second section which extends from said oxidizing agent supply conduit shelf passage first section in a direction that is substantially parallel to said heater axis such that said oxidizing agent supply conduit shelf passage second section provides fluid communication from said oxidizing agent supply conduit shelf passage first section to said oxidizing agent supply intermediate conduit; and said anode exhaust return conduit shelf passage includes an anode exhaust return conduit shelf passage first section which is substantially perpendicular to said heater axis and also includes an anode exhaust return conduit shelf passage second section which extends from said anode exhaust return conduit shelf passage first section in a direction that is substantially parallel to said heater axis such that said anode exhaust return conduit shelf passage second section provides fluid communication from said anode exhaust intermediate conduit to said anode exhaust return conduit shelf passage first section.

27. The heater as in claim 26 wherein:

a fuel supply orifice is disposed within said fuel supply conduit shelf passage second section such that said fuel supply orifice provides a predetermined magnitude of restriction, thereby regulating flow of said fuel to said fuel cell stack assembly; and an oxidizing agent supply orifice is disposed within said oxidizing agent supply conduit shelf passage second section such that said oxidizing agent supply orifice provides a predetermined magnitude of restriction, thereby regulating flow of said oxidizing agent to said fuel cell stack assembly.

28. The heater as is claim 26 wherein:

said fuel supply conduit shelf passage also includes a fuel supply conduit shelf passage sediment trap which extends from said fuel supply conduit shelf passage first section in a direction that is opposite of said fuel supply conduit shelf passage second section; and said oxidizing agent supply conduit shelf passage also includes an oxidizing agent supply conduit passage sediment trap which extends from said oxidizing agent supply conduit shelf passage first section in a direction that is opposite of said oxidizing agent supply conduit shelf passage second section.

29. The heater as in claim 1 wherein:

said first medium conduit includes a first medium conduit alignment hole and said first medium conduit shelf includes a first medium conduit shelf alignment hole such that a first medium conduit shelf alignment pin is located within said first medium conduit alignment hole and said first medium conduit shelf alignment hole; and said second medium conduit includes a second medium conduit alignment hole and said second medium conduit shelf includes a second medium conduit shelf alignment hole such that a second medium conduit shelf alignment pin is located within said second medium conduit alignment hole and said second medium conduit shelf alignment hole.

* * * * *